United States Patent
Fischer et al.

(10) Patent No.: US 8,130,854 B2
(45) Date of Patent: Mar. 6, 2012

(54) NONLINEAR PRECODING METHOD FOR A DIGITAL BROADCAST CHANNEL

(75) Inventors: Robert Fischer, Erlangen (DE); Christoph Windpassinger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1100 days.

(21) Appl. No.: 10/564,832

(22) PCT Filed: Jul. 7, 2004

(86) PCT No.: PCT/DE2004/001455
§ 371 (c)(1),
(2), (4) Date: Jan. 17, 2006

(87) PCT Pub. No.: WO2005/011219
PCT Pub. Date: Feb. 3, 2005

(65) Prior Publication Data
US 2006/0198459 A1    Sep. 7, 2006

(30) Foreign Application Priority Data
Jul. 17, 2003   (DE) .................................. 103 33 514

(51) Int. Cl.
H04B 7/02 (2006.01)
H04L 5/12 (2006.01)
H03M 7/00 (2006.01)

(52) U.S. Cl. ........................... 375/267; 375/265; 341/50

(58) Field of Classification Search .................. 375/267, 375/265; 341/50
See application file for complete search history.

(56) References Cited

U.S. PATENT DOCUMENTS

| | | | | |
|---|---|---|---|---|
| 6,687,310 | B1* | 2/2004 | Fimoff et al. | 375/265 |
| 6,715,124 | B1* | 3/2004 | Betts | 714/792 |
| 6,904,110 | B2* | 6/2005 | Trans et al. | 375/350 |
| 7,317,764 | B2* | 1/2008 | Hochwald et al. | 375/296 |
| 2005/0052292 | A1* | 3/2005 | Shalvi | 341/50 |
| 2006/0140298 | A1* | 6/2006 | Dowling | 375/260 |

OTHER PUBLICATIONS

H. Yao et al, "Lattice-Reduction-Aided Detectors for MIMO Communication Systems", Proceedings of IEEE Globecom 2002, Nov. 2002, pp. 424-428.*

(Continued)

*Primary Examiner* — David C. Payne
*Assistant Examiner* — Sarah Hassan
(74) *Attorney, Agent, or Firm* — Staas & Halsey LLP

(57) ABSTRACT

Several subscriber signals are transmitted simultaneously and at the same frequency by a central transmitter to several decentralized receivers which do not cooperate with each other, by digital message transmission in a broadcast channel. A common transmission signal, which enables an error-free individual reception, should be generated with knowledge of all subscriber signals and of the current transmission conditions, by signal preprocessing methods on the transmission side. Known nonlinear precoding methods totally suppress the interference signals, so that the channel diversity cannot be used. In the claimed precoding method, the occurring interference signals are, on the contrary, taken into account. On the basis of a modulo arithmetic calculation, the transmission channel is not totally equalized, but virtually divided, so that the transmission of the subscriber signals is continued periodically; the signals are selected according to the minimal transmission power and pre-equalized, in a linear manner, and the residual interferences, still remaining between the subscriber signals, may assume special values from a preset set of values. The set of values is selected, so that the interference signals of the other subscribers are also merely reflected in the otherwise already existing periodic continuation and can be suppressed or used as required by a modulo decision, on the reception side.

3 Claims, 3 Drawing Sheets

OTHER PUBLICATIONS

W. Yu et al.; "Trellis Precoding for the Broadcast Channel"; IEEE Global Telecom Conference, Nov. 2001, vol. 2, pp. 1344-1348.*
Ginis et al, "A Multi-user Precoding Scheme achieving Crosstalk Cancellation with Application to DSL Systems," IEEE document, 2000, pp. 1627-1631.*
Fischer et al, "Space-Time Transmission using Tomlinson-Harashima Precoding" Proceedings of 4th International ITG Conference on Source and Channel Coding, Jan. 2002, pp. 139-147.*
Yao et al. Lattice-Reduction-Aided Detectors for MIMO Communication Systems IEEE. published 2002.*
C. Windpassinger et al.; "Low-Complexity Near-Maximum—Likelihood Detection and Precoding for MIMO Systems using Lattice Reduction", ITW2003, Paris France, Mar. 31-Apr. 3, 2003, pp. 345-348.
R. F. H. Fischer et al.; "MIMO Precoding for Decentralized Receivers", Proceedings 2002 IEEE Int'l Symposium on Information Theory, Jun. 30-Jul. 5, 2002, p. 496.
W. Yu et al.; "Trellis Precoding for the Broadcast Channel", Globecom '01, 2001 IEEE Global Telecom Conference, Nov. 25-29, 2001, vol. 2 of 6, pp. 1344-1348.
International Search Report for International Application No. PCT/DE2004/001455 mailed Nov. 11, 2004.

M. Tomlinson, "New Automatic Equaliser Employing Modulo Arithmetic", Electronics Letters; Mar. 1971; vol. 7, Nos. 5/6; pp. 138-139.
H. Harashima et al.; "Matched-Transmission Technique for Channels With Intersymbol Interference"; IEEE Transactions of Communications, vol. Com-20, No. 4, Aug. 1972; pp. 774-780.
R. Fischer et al., "Space-time Transmission Using Tomlinson-Harashima-Precoding", Proceedings of 4th International ITG Conference on Source and Channel Coding, Jan. 2002, pp. 139-147.
R. Fischer et al., MIMO-Precoding for Decentralized Receivers, Proceedings of International Symposium on Information Theory—ISIT 02, Jun./Jul. 2002, p. 496.
C. Windpassinger et al.; "Low-Complexity Near-Maximum-Likelihood Detection and Precoding for MIMO System Using Lattice Reduction"; Proceedings of IEEE Information Theory Workshop; Mar./Apr. 2003; pp. 345-348.
R. Fischer et al., "Tomlinson-Harashima Precoding in Space-Time Transmission for Low-Rate Backward Channel"; 2002 International Zurich Seminar on Broadband Communications; Feb. 2002, pp. 7-1 to 7-6.
International Search Report for International Application No. PCT/DE2004/001455; mailed Jul. 17, 2003.

* cited by examiner prior art

NONLINEAR PRECODING METHOD FOR A DIGITAL BROADCAST CHANNEL

CROSS REFERENCE TO RELATED APPLICATIONS

This application is based on and hereby claims priority to German Application No. 103 33 514.5 filed on Jul. 17, 2003, the contents of which are hereby incorporated by reference.

BACKGROUND OF THE INVENTION

1. Field of the Invention

The invention relates to a nonlinear precoding method based on a modulo arithmetic for the transmit-side preequalization of K user signals to be transmitted at the same time and frequency in a digital broadcast channel with known transmission behavior set up between a central transmitting station and K decentralized, non-interconnected receiving stations, user signals consisting of data symbols $a_k$ with k from 1 to K from an $M_k$-level signal constellation having a signal point spacing $A_k$ with a periodic multiple representation of the undisturbedly transmitted data symbols $a_k$ in data symbol intervals congruent for K receive-side modulo decision devices, a transmit-power-minimizing selection of representatives $v_k$ from the range of values $a_k + A_k \cdot M_k \cdot z_{kk}$ where $z_{kk}$ is from the set of integers, and linear preequalization of the selected representatives $v_k$ to form transmit signals $x_k$ to be transmitted.

2. Description of the Related Art

In a broadcast channel, a plurality of user signals present at a common (i.e. central) transmitter (e.g. a base station) are digitally transmitted to a plurality of decentralized (i.e. scattered over a service area) receivers (e.g. mobile stations). Signal transmission user signal → receive signal is unidirectional in the downlink. The particular feature of signal transmission in a broadcast channel is the lack of cooperability between the individual receivers. At no receiver are the signals of the other receivers known, and communication between the individual receivers is not possible. Consequently there can be no joint data processing of the receive signals in a central receiver. Transmission-improving signal conditioning can therefore only take place at the transmit side in the common transmitter. Signal transmission can be wireline, but tends to be non-wireline. The essential but imperfect differentiation of the signals for correct assignment of each user signal to the associated receiver is performed by Code Division Multiple Access (CDMA) or by Space Division Multiple Access (SDMA). The resulting overall structure with a large number of signal inputs (user signals) and a large number of signal outputs (receive signals) is known as a MIMO system (Multiple Input Multiple Output). Moreover, in the case of non-wireline signal transmission (radio transmission), multi-antenna systems are being increasingly used in which the signals are transmitted via a large number of transmitting antennas to a large number of receiving antennas, the numbers of antennas possibly being the same or different and having an impact on signal processing. In general, time and space diversity can be advantageously utilized in a MIMO system.

The problem arising from a plurality of receivers being supplied from a common transmitter is that the individual users are supplied not only with their own wanted signals, but that other users' signals are superimposed thereon, resulting in interference signals. The occurrence of crosstalk interferences is synonymous with loss of the orthogonality which would be present in the case of ideal transmission behavior with decoupled subchannels. On the transmit side it must therefore be attempted, knowing the user signals and the transmission conditions currently obtaining in the broadcast channel, i.e. the individual crosstalk factors between the individual users, to generate a suitable common transmit signal in such a way that each user receives his desired signal but without interference from the other signals. In contrast to the twin problem of the multiple access of scattered transmitters to a common receiver (uplink) for which many approaches are now known, the literature only contains a small number of methods for solving the described problem of serving spatially separated, non-cooperating receivers from a common transmitter. The described transmission scenario can be expressed in a mathematically compact and general manner using the well-known channel equation $$y = Hx + n$$

The possibly already preprocessed transmit symbols of the K users are combined in the vector $x = [x_1, x_2, \ldots, x_K]^T$ (vector and matrix notation in bold). The complex-valued elements $h_{kl}$ of the channel matrix H describe the couplings between the transmission paths l→k, i.e. the crosstalk of the user l onto the user k. The ideal channel matrix H without couplings is a diagonal matrix, preferably an identity matrix (value 1 on the main diagonal). The channel matrix H can be estimated by various known methods with backchannel or, in the case of duplexing with time division multiplex, also without backchannel and is assumed to be known at the central transmitter (presence of the so-called Channel State Information CSI). Combined in the vector n are the unavoidable noise effect (additive noise) of the electronic components involved and other external interference, and the elements of the vector $y = [y_1, y_2, \ldots, y_K]^T$ are the receive symbols at the individual receivers. The first known approach for a broadcast channel involves linear preequalization of the user signals (Linear Channel Inversion LCI). From the users' data signals $a_k$ present, combined in the vector a, the transmit symbols $x_k$ (the term "symbol" in this context means a real or complex number representing the information) are formed according to $$x = H^{-1} a$$

where $H^{-1}$ represents the inverse matrix to H, which can only be formed, however, if the transmission matrix is non-singular (determinant of the matrix is non-zero). it is achieved, however, that no interference signals are produced at the receivers and the data symbols $a_k$ appear directly (with only additive noise superimposed). There is therefore complete decoupling of the individual direct transmission paths k→k (orthogonality). However, the disadvantage of this procedure is the associated, in some cases very substantial, increase in the average transmit power required. This effect is greater the more strongly the matrix $H^{-1}$ tends to a singular matrix.

A significant increase in the average transmit power is avoided if, instead of linear preprocessing of the user signals, joint nonlinear preequalization (precoding method) is used. With the known preceding methods, however, the mutual interference signals are likewise completely suppressed, so that diversity reception cannot be utilized. Precoding methods can be developed from the twin problem to this situation, i.e. the multiple access scenario (multiple access problem e.g. in the uplink transmit direction in which a plurality of distributed users access a common receiver). There, nonlinear equalization can be performed by successive elimination of the interference signals which is implemented, for example, in the known V-BLAST method and can be termed Zero Forcing Decision Feedback Equalization (ZF-DFE) completely eliminating (Zero Forcing ZF) the interference signals. An established preceding method is known according to Tomlinson and Harashima (THP—Tomlinson-Harashima Precoding) and is based on the use of modulo arithmetic. This procedure is described for the first time by M. Tomlinson in publication I "New Automatic Equaliser Employing Modulo Arithmetic" (Electronics Letters, vol. 7, Nos. 5/6, pp. 138-139, March 1971) and by H. Harashima and H. Miyakawa in publication II "Matched Transmission Technique for Channels with Intersymbol Interference" (IEEE Transactions on Communications, Vol. com. 20, No. 4, pp. 774-780, August 1972). Originally the nonlinear precoding methods were only designed for channels with one input and one output, but with intersymbol interference (ISI) present. It was later recognized that they could also be used on MIMO channels in order to suppress interchannel interference (ICI) or a combination of ISI and ICI. This transmission is described in detail, with the coining of the term MIMO preceding, in publication III by R. Fischer et al. "Space-time Transmission using Tomlinson-Harashima-precoding" (Proceedings of 4. ITG Conference on Source and Channel Coding, pp. 139-147, Berlin, January 2002).

This preequalization can be used in the central transmitter instead of receive-side feedback equalization which is only possible in the case of a central receiver. To ensure that the average transmit power is not significantly increased in the process, THP operates on a nonlinear basis. Here modulo reduction with a sawtooth characteristic limits the transmit signal $x_k$ to the range $(-M_k/2, +M_k/2]$ at a level number $M_k$ of the signal constellation selected for the relevant data symbol $a_k$ and a selected signal point spacing $A_k=1$. It should be pointed out at this juncture that in principle a separate level number $M_k$ and a separate signal point spacing $A_k$ can be selected for each data stream to be transmitted. In general, however, for the sake of simplicity these parameters are selected identically for all the user signals to be transmitted. For any given data signals, the output signal is constantly held between predefined modulo limits by a simple addition rule, by which the transmit power can be significantly reduced compared to linear methods. This limiting is performed symbol-by-symbol without memory and is equivalently representable as the addition of a correction symbol which may assume an integral multiple of $A_k \cdot M_k$. The now apparently linear preequalization in this approach completely nullifies the channel distortion. Essentially with THP, by multiple representation of the data symbols $a_k$ and selection of suitable representatives $v_k$ which are then linearly preequalized, the transmit signal is therefore formed according to $x=H^{-1}v$ so that any appreciable increase in the average transmit power can be avoided. By the multiple representation and selection of a suitable representative $v_k$, one more degree of freedom is therefore provided for signal processing. In the case of binary transmission, the binary symbols "0" and "1" can be represented e.g. by the amplitude values of +0.5 and −0.5 (signal point spacing $A_k=1$), corresponding to an $M_k=2$-level signal constellation. On the basis of the amplitude values selected, when using precoding the binary symbol "0" can, for example, be represented by . . . −3.5; −1.5; +0.5; +2.5; +4.5; . . . and the binary symbol "1" by . . . −2.5; −0.5; +1.5; +3.5; +5.5; . . . with a respective addition of an integer (multiple of $M_k=2$). With knowledge of all the user data symbols $a_k$ (having the values +0.5 and −0.5), the representatives $v_k$ (from the range of values (+0.5+2z) where z is a positive or negative integer) are then selected such that, after linear preequalization of the channel, the transmit signal $x=H^{-1}v$ possesses a low average power or smallest possible amplitude.

The related art on which the present invention proceeds is disclosed in publication IV of R. Fischer et al.: "MIMO-Precoding for Decentralized Receivers" (Proceedings of International Symposium on Information Theory—ISIT 02, Lausanne, Switzerland, June/July 2002, p. 496). In continuation of publication III, a modified THP using nonlinear modulo arithmetic is described for a broadcast channel with downlink scenario in which the decentralized receivers have no contact with one other. The transmit-side nonlinear pre-processing can be derived from DFE and has, in mathematical terms, a unitary matrix F operated in the forward direction whose function is to transform the channel matrix into triangular form, and a matrix B present in the nonlinearly operating feedback loop in the form of a lower triangular matrix with unit main diagonal. If the overall channel matrix for the transmission behavior is of triangular form, the interference signals occurring can be precompensated bit by bit in the feedback branch of the central transmitter using modulo arithmetic. At the individual receivers, the data then appears as if the other users (with parallel transmission paths to the other receivers) did not exist.

As mutual interference signals are therefore completely avoided also when using nonlinear precoding methods, in each receiver the transmitted data symbols $a_k$ can be recovered or estimated values for them can be formed by threshold decision-making which takes account of the periodic continuation of the amplitude values or signal point spacings (modulo decision device). However, the disadvantage of these preceding methods is that no "diversity gain" can be achieved because of the complete prevention of mutual interference signals. Each transmission subsystem (one user signal to the associated receiver) functions as if it is operated via a separate channel (with one input and output). Specifically in the case of fading channels this involves a high error rate at times of poor transmission conditions. However, if signals are jointly processed and transmitted, a diversity gain can in principle be achieved. If in the case of two transmission paths one of them has poor transmission conditions, it is highly probable that the other transmission path is quite usable.

SUMMARY OF THE INVENTION

On the basis of publication VI it is therefore an object of the present invention to further develop a nonlinear precoding method of the generic type for a broadcast channel with decentralized receivers in such a way that its available diversity due to interference signals present can be utilized. The method is designed to be simple in its execution and to ensure high transmission quality.

The precoding method according to the invention for transmit-side, joint preprocessing of the user signals is based on the above described THP and returns to the idea of periodic continuation of the possible representatives for the individual data symbols $a_k$, the mutually superimposed interference signals no longer being zero forced but being included by the joint preprocessing by assigning values from a precisely defined set of values to these interference values also, the values permitted for characterizing the interference signals being selected such that the receive-side modulo decision devices can still decide reliably on the transmitted data symbol $a_k$ even with the interference signals present. Since when using THP the receive-side modulo decision devices already allow for a periodic ambiguity of the data symbols $a_k$, the interference signals may now assume values which mean that a different representative $v_k$ from the possible set of representatives, but which represents the same data symbol $a_k$, appears at the receiver, the range of values $(a_k+A_k \cdot M_k z_{kk}$, where $z_{kk}$ is a positive or negative integer including zero) for the data symbols transmitted undisturbedly from user k to receiver k differing by just the original data symbol $a_k$ from the range of values ($A_k \cdot M_k \cdot M_k \cdot z_{Ik}$, where $z_{Ik}$ is a positive or negative integer including zero) for the superimposed interference signals from user I to receiver k, the subscriber k being excluded. With the precoding method according to the invention, interference signals present, by producing a permissible shifting of the modulo-coded user signals into decision intervals for identical data symbols, are therefore taken into account and co-processed. Although the periodic shifting means that the decision intervals are different, the result of the decision and its reliability are identical.

In the above described numerical example for binary data transmission, the mutual interference signals may therefore assume the values . . . −4; −2; 0; +2; +4; . . . (even numbers) and therefore be even-numbered. However, the mapping of the interference signals to multiples of whole numbers also applies to any other selection of $M_k$-level signal constellations. The precoding according to the invention can also be applied to the quadrature amplitude modulation schemes (e.g. 4QAM or 16QAM) using complex number space. In this kind of modulation the data vector a consists of data symbols $a_k$ (also known as signal points) from a complex-valued QAM alphabet. The real parts of the symbols are transmitted with a cosine wave modulation and the imaginary parts with a sine wave modulation (quadrature mixing). When using complex-valued channel descriptions (complex-valued matrix entries) it is advisable first to split the entries up into two real-valued components, i.e. real and imaginary part and represent them as real transmission using twice as many sub-signals. The channel matrix $H_r$ therefore attains twice the dimension (2K). On the receive side, demodulators are provided which detect the voltage values phase-correctly and re-assign the real components real and imaginary part. Then finally transformation back to the complex-valued space again takes place. We get:

$$\begin{bmatrix} \text{Re}\{y\} \\ \text{Im}\{y\} \end{bmatrix} = \begin{bmatrix} \text{Re}\{H\} & -\text{Im}\{H\} \\ \text{Im}\{H\} & \text{Re}\{H\} \end{bmatrix} \cdot \begin{bmatrix} \text{Re}\{x\} \\ \text{Im}\{x\} \end{bmatrix} + \begin{bmatrix} \text{Re}\{n\} \\ \text{Im}\{n\} \end{bmatrix}$$

where Re and Im denote the real and the imaginary part of the relevant variable and define, according to the definition selected, an equivalent 2K-dimensional, real-valued (MIMO) channel model according to:

$$y_r = H_r x_r + n_r.$$

In order to simplify the equalization and advantageously utilize the possible diversity, with the preceding method according to the invention the broadcast channel present is notionally subdivided into two sections. The first part is completely equalized by preceding, the user signals are therefore decoupled, but a periodic continuation of the data symbols takes place. The current representative $v_k$ for the data symbols $a_k$ is selected on an ongoing basis from the possible values which differ by integral multiples of the original level number $M_k$, so that after linear preequalization of the selected representatives $v_k$ the required transmit power is minimal. The second part of the channel is not equalized and therefore produces residual interference between the user signals. By suitably selecting this part, however, it can be achieved that, on the one hand, the residual interference is so constituted that it does not adversely affect decision making in the receivers and, on the other, that equalization of the first part of the channel is possible with lower receive-side gain and therefore lower noise amplification or the diversity of the channel can be at least partially utilized. Since when using preequalization methods the user signals already appear periodically continued at the receivers, the residual interference may assume values coinciding with the spacing of the possible representatives, the interference being reflected only in the (virtual) selection of a different representative, and its effect being completely eliminated in the modulo decision device already present. The crucial advantage of the invention is the greatly increased power efficiency of signal transmission. By the preceding method, a lower bit error rate, i.e. reliable reception, can be achieved at the same average transmit power as with the known precoding methods. In particular, using the precoding method, a diversity gain can be obtained which makes itself positively felt in a more rapid reduction in the bit error rate as the transmission quality of the broadcast channel improves.

A partial equalization of the transmission channel corresponds to using a changed channel description, in mathematical terms converting the channel matrix $H_r$ to a reduced channel matrix $H_{red}$. Its multiplication with a suitable residual interference matrix R describing the remaining mutual couplings then yields once again the channel matrix $H_r$ according to the decomposition $$H_r = R H_{red}.$$

The residual interference matrix R is only dependent on the current transmission behavior of the channel. As long as the channel matrix H (or $H_r$) does not change (burst transmission), the residual interference matrix R does not change either. On the main diagonal the residual interference matrix R is occupied by ones (direct signal paths), all the other elements assume row-wise only integral (positive or negative) multiples of the level number $M_k$. In the case of binary transmission per component, these elements are only even (positive or negative) numbers:

$$R = \begin{bmatrix} 1 & & 2Z \\ & \ddots & \\ 2Z & & 1 \end{bmatrix}$$

Various methods can be used for suitable decomposition of the channel matrix H. By using the Monte Carlo method, the appropriate coefficients can be determined e.g. empirically. Optimum decomposition methods must be selected for their complexity, which should be as low as possible, and for required receive-side gain that is as small as possible (e.g. by Automatic Gain Control AGC).

Other matrix reductions for MIMO channels are known from the related art as lattice reduction. In publication V by H. Yao et al.: "Lattice-Reduction-Aided Detectors For MIMO—Communication Systems" (Proceedings of IEEE Globecom 2002, Taipei, Taiwan, November 2002) there is described a low-complexity detection method for channels with a plurality of inputs and outputs. The basic idea is the use of mathematical methods which are known from the field of lattice theory (theory of regular lattices), the MIMO channel not being linearly equalized completely but, on the basis of another, more suitable representation (reduced basis), the channel is only partly equalized so that a simple component-wise (i.e. in respect of the individual user signals) threshold decision is possible. Only after further postprocessing are the required estimated values for the transmitted data signals obtained. However, the known method specifically considering the case of two transmitting and two receiving antennas differs fundamentally from the invention in that there, in a multi-antenna system, all the user receive signals are known on the receive side and joint signal processing is possible. In contrast to this, the precoding method according to the invention relates to the problem in a multiuser system with exclusively downlink direction. Here a common transmitter is present at which all the user signals are known and can be processed. On the other hand, the receivers scattered over a service area cannot cooperate, i.e. each receiver sees only its own receive signal (no joint processing possible). The known (partial) equalization takes place exclusively on the receive side on an exclusively linear basis, i.e. the reduced portion of the channel is equalized using the inverse channel matrix. The invention operates exclusively nonlinearly on the transmit side on the basis of THP.

Publication VI of Ch. Windpassinger and R. Fischer: "LowComplexity Near-Maximum-Likelihood Detection and Precoding for MIMO Systems using Lattice Reduction" (Proceedings of IEEE Information Theory Workshop 2003, pp. 345-348, Paris, France, March/April 2003) is based on and expands publication V. The low-complexity detection method for MIMO channels with a plurality of inputs and outputs is extended from the 2×2 scenario to the general case of K inputs and outputs. In addition, the linear partial equalization is replaced by a nonlinear precoding. However, the critical difference from the invention is that these methods again relate to multi-antenna systems in which all the partial receive signals are known on the receive side and joint processing is possible. The preequalization method of the present invention is, on the other hand, designed for decentralized receivers that cannot cooperate, wherein lies a particular difficulty for signal processing, because it can only take place on the transmit side.

To equalize the channel portion, described by the reduced portion $H_{red}$, this reduced matrix is further factorized into suitable matrices. This decomposition can have e.g. the following form:

$$P^T H_{red} = 1/gBF^{-1},$$

where F is a matrix with orthogonal columns, B is the lower triangular matrix, P a permutation matrix (each row and each column contains a single 1), and g the receive-side gain factor (automatic gain control). All three matrices and the scalar can be unambiguously determined from $H_{red}$ according to a predefined criterion (preferably minimum g).

For normal selection of the signal points from the array of integers shifted by ½ in the numerical example given above, a systematic offset is produced on the receive side. This can be eliminated either by correspondingly modified receivers or more simply by transmit-side offset compensation for which no additional transmitting energy is required. This takes place by subtraction of the vector o according to $$o = P^T (R-I)[½ \ldots ½]^T.$$

BRIEF DESCRIPTION OF THE DRAWINGS

These and other objects and advantages of the present invention will now become more apparent and more readily appreciated from the following description of the preferred embodiments, taken in conjunction with the accompanying drawings of which.

DETAILED DESCRIPTION OF THE PREFERRED EMBODIMENT

Figure 1:
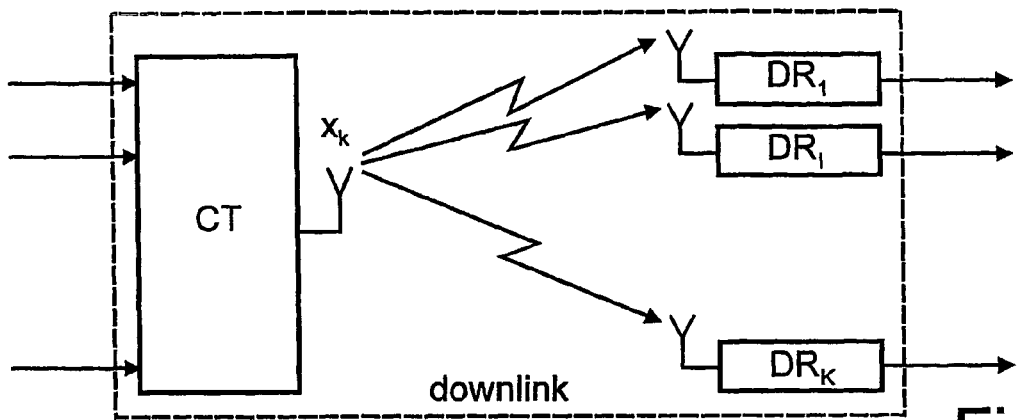
FIG. 1 shows a broadcast channel.

Reference will now be made in detail to the preferred embodiments of the present invention, examples of which are illustrated in the accompanying drawings, wherein like reference numerals refer to like elements throughout.

FIG. 1 schematically illustrates the structure of a broadcast channel BC for digital communication of K user signals $ST_k$ from a common, central transmitter CT (e.g. a base station) to K decentralized receivers $DR_k$ (e.g. mobile stations) which shall in each case only receive their own receive signal $SR_k$ and have no contact with the adjacent receivers $DR_k$. Transmission takes place exclusively in the downlink direction, non-wireline radio transmission being used in the case illustrated. The broadcast channel BC considered in its entirety has a large number of inputs and a large number of outputs and can therefore be interpreted as a MIMO channel (Multiple Input Multiple Output). A multiuser system is present here which must be differentiated from a multi-antenna system which likewise defines a MIMO channel.

Figure 2:
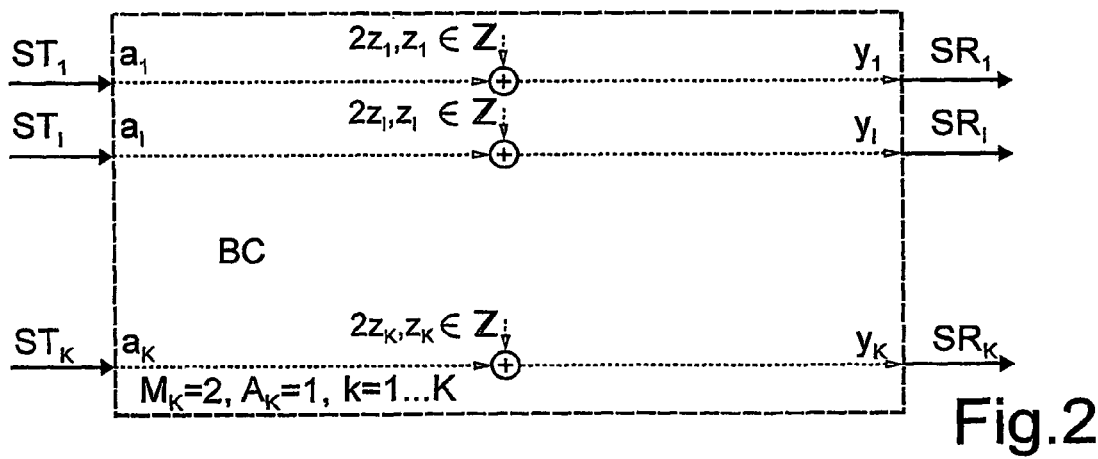
FIG. 2 shows the decoupling of the broadcast channel by a related art precoding method.

FIG. 2 shows for a selected exemplary embodiment with $M_k=2$, $A_k=1$ and $k=1, \ldots, K$ the completely decoupled broadcast channel BC on the basis of applying the known nonlinear precoding method THP (Tomlinson-Harashima-Precoding) using modulo arithmetic which has already been explained above. Basically there is added to each data symbol $a_k$ (assigned to the user signals $ST_k$) a special value of an integral multiple of the product of the level number $M_k$ and the signal point spacing $A_k$ of the signal constellation ($A_k \cdot M_k \cdot z$ where z is a positive or negative integer including zero) and the best value in respect of minimum transmit power is selected and the signal representative thus obtained is linearly preequalized. THP is used on the transmit side to produce in the central transmitter CT a common transmit signal such that each decentralized receiver $DR_k$ receives its required receive signal $SR_k$. Interference signals present are completely eliminated with this preceding method THP so that channel diversity cannot be used.

Figure 3:
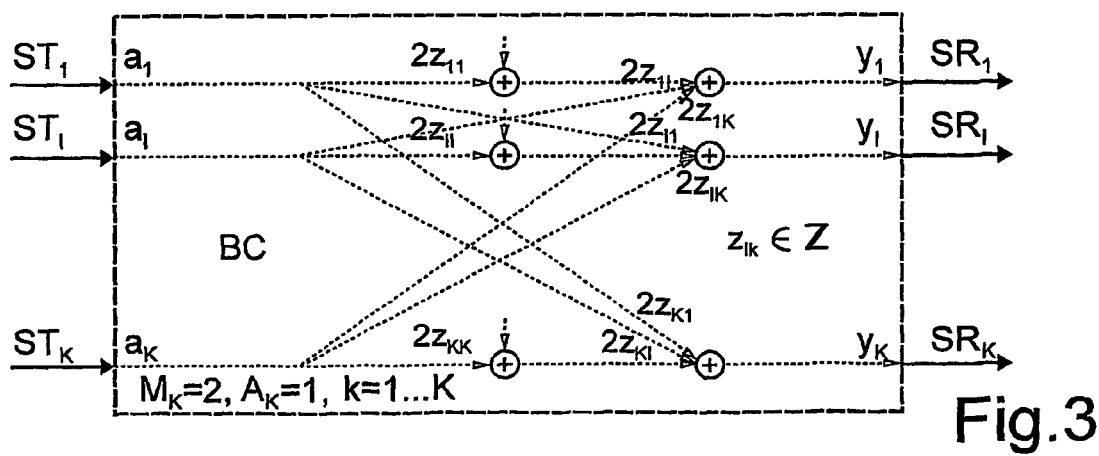
FIG. 3 shows the broadcast channel with the preceding method according to the invention superimposed on it.

FIG. 3, on the other hand, illustrates the application of the nonlinear precoding method according to the invention, taking interference signals into account. With this method the interference signals in the case of binary (in the exemplary embodiment shown with $M_k=2$, $A_k=1$ and $k=1, \ldots, K$) transmission with even, integral values between the values for the user signals $ST_k$ are multiply represented, the interference symbols between the data symbol $a_I$ (with I from 1 to K and not equal to k) and the data symbol $a_k$ being assigned periodic representatives from the value range $A_k \cdot M_k \cdot z_{Ik}$ where $z_{Ik}$ is from the set of integers. The mapping of the interference signals to even, integral values (even-numbered interferences) can be appropriately shortened using EIIP (Even-Integer Interference Precoding). In FIG. 3 the basic principle of partial channel equalization on which EIIP is based can be clearly seen, whereby the broadcast channel BC is virtually converted into a reduced channel without coupling (first addition positions) which undergoes nonlinear precoding (shown in linearized form), and a superimposition of the suitably formed interference signals (second addition positions) is discriminated.

Figure 4:
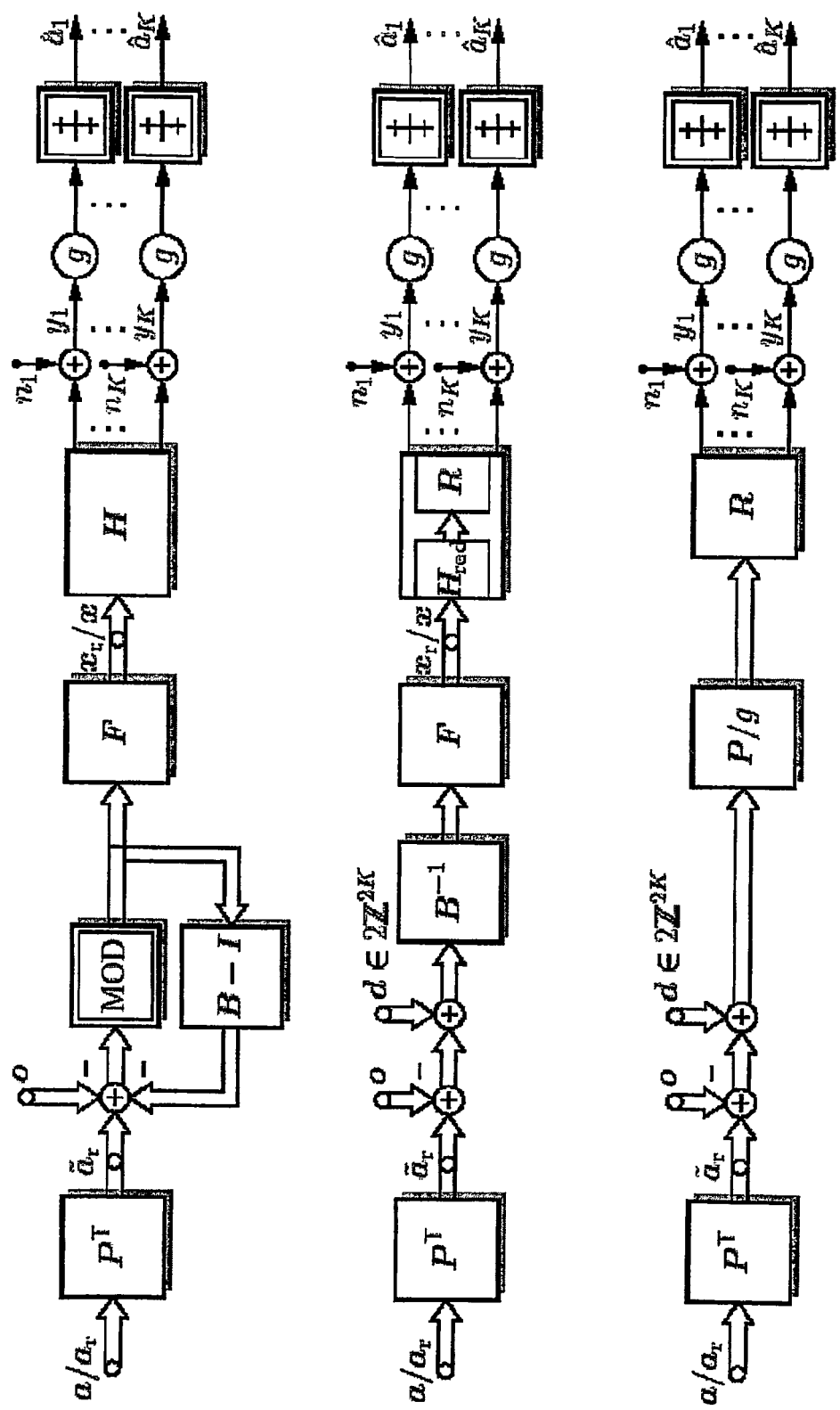
FIG. 4 shows a block diagram of the preceding method according to the invention.

FIG. 4 (top) shows the entire transmission system as it is provided in the proposed partially equalizing precoding method EIIP. The channel matrix H denotes the actual transmission channel with K users. At its input, all the transmit signals can be jointly accessed, which is indicated by a wide vector arrow. At its output, the user signals $y_k$ with k from 1 ... K are only processed singly, here indicated by individual scalar arrows. On the receive side, further noise $n_k$ is superimposed. In the normal abstract representation shown, the receivers each consist only of a scaling device (Automatic Gain Control) and a threshold decision device (indicated in FIG. 4 by a g in the circle and a double-bordered box with threshold decision, the double-border standing for a nonlinear operation). The transmitter consists of the first three functional blocks. This involves a permutation matrix $P^T$ depending on the existing channel matrix H (or $H_{red}$), a feedback loop with a nonlinear modulo operation MOD, the identity matrix I and a lower triangular matrix B as well as a matrix F with orthogonal columns. The data symbols to be transmitted (taken from a QAM alphabet) are combined in the K-dimensional vector a. Each receiver wishes to receive its data symbol $a_k$ (and that alone). This vector with complex entries is first converted into a real vector (separation of the complex components into real and imaginary part as already described above), symbolized by the notation $a/a_r$. The further processing in the transmitter takes place on a real-value basis. The transmitter produces transmit symbols, combined in the vector $x_r$. These are then translated to a complex-valued representation (combination of real and imaginary part to form a complex number; reverse process as above), as the channel processes complex-valued input symbols.

The first stage of the transmitter is a permutation (re-sorting) of the components of the vector $a_r$. The next functional block is the nonlinearly operating feedback loop known in precoding methods. Here the interference signals occurring during transmission over the channel are already pre-compensated. In order not to increase the transmit power, a modulo operation MOD is used here which limits the output symbols to a fixed predefined interval by addition/subtraction of a suitable integral value (corresponding to a periodic continuation of the original signal constellation). All the signal points possessing a predefined spacing $A_k \cdot M_k$ from one another, e.g. in the case of binary transmission ($M_k=2$) and signal point spacing $A_k=1$ equivalent to $A_k \cdot M_k=2$, represent the same message (bit combination). Finally another unitary matrix F is applied which converts the general channel matrix into a lower triangular matrix without increasing the transmit power. Only thus can successive processing, as required, take place in the transmitter.

To ensure that the receive signals appear without offset o at the receivers, this is already pre-compensated in the transmitter. The matrices P, B and F are computed uniquely from the reduced form of the channel matrix as described above. The precoding therefore equalizes only this reduced portion; the interference signals due to the residual interference matrix R (see above) remain.

The mode of operation of transmission is illustrated in the middle and bottom row in FIG. 4. First the preceding loop is replaced by its linearized representation. The modulo operation is replaced by the addition of a correction term d. The remaining, linear feedback loop (forward transmission One; feedback B-I) is then realized precisely by the matrix $B^{-1}$ (inverse matrix of B). The channel matrix is represented, as described in the exemplary embodiments above, as a cascade of the reduced channel matrix $H_{red}$ and the residual interference matrix R. Because of the specific construction of the matrices B and F from $H_{red}$, the cascade of $B^1$, F and $H_{red}$ produces precisely the matrix P/g (again above equation), thereby producing the structure shown in the bottom row. The permutation matrices $P^T$ and P cancel each other out; as transmission matrix, there therefore remains only the residual interference matrix R. This describes the interferences (couplings) between the user signals. As the main diagonal is one, the wanted signals are transmitted ideally. The secondary diagonal elements which describe the crosstalk between the users, are even-numbered in the case of binary transmission; only even-numbered interferences therefore occur. However, this does not impair the existing modulo decision.

Figure 5:
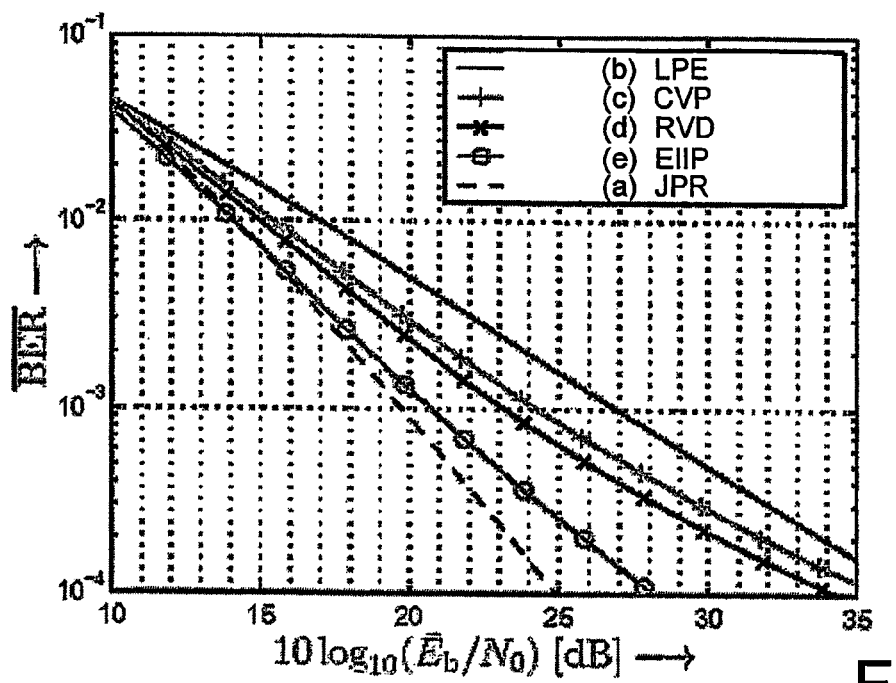
FIG. 5 shows bit error curves for various equalization methods and FIG. 6 shows the gain factors for various equalization methods.

FIG. 5 shows the average bit error curves of the users for various signal processing methods. The average bit error rate BER in each case is plotted against the ratio (expressed in dB) of the average transmit energy $E_b$ per information bit to the spectral power density $N_0$ of the additive noise. Two users (K=2) are assumed, which occurs relatively often if, for example, in addition to a large number of users with low data rates and transmit powers there are two users with high data rates and transmit powers to which preprocessing is then limited. On the basis of the method selected, specifically the decomposition of the reduced channel matrix $H_{red}$ into g, F, B and P, the same bit error characteristic is produced for both users. The most favorable bit error characteristic is provided by joint signal processing at the receiver (joint processing at receiver JPR, curve a), the least favorable by purely linear channel inversion on the transmit side (linear preequalization LPE, curve b). Increasingly favorable error behavior is then shown by the transmission channel with transmit-side nonlinear complex-valued precoding (CVP, curve c) and real-valued preceding (RVP, curve d). The error behavior coming nearest to receive-side joint signal processing is achieved using the precoding method according to the invention with partial channel equalization taking interference into account (EIIP, curve e).

Figure 6:
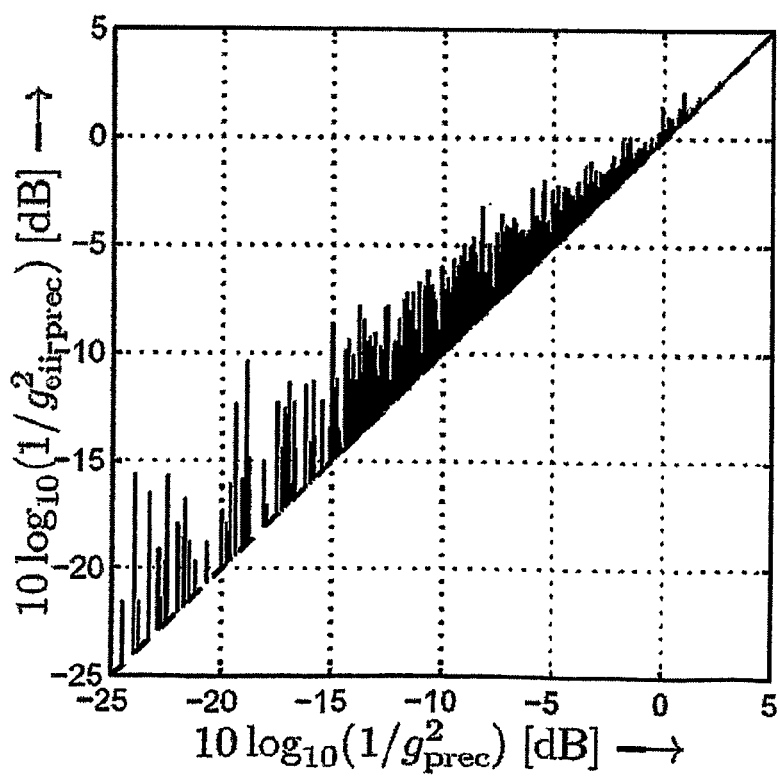

Due to the significantly improved error behavior with the nonlinear preceding method according to the invention EIIP, much lower gain factors are required on the receive side despite the minimized transmit power. For a transmission system with two users (K=2), FIG. 6 plots the gain factors $g_{EIIP-PREC}$ using nonlinear preceding according to the invention against the gain factors $g_{PREC}$ which arise with a real-valued preceding method not taking account of the interference (the representation is in dB as the inverse of the square, as the signal-to-noise ratio SNR is proportional to this term and this term directly describes the capability of the method). The magnitude of the gain factor $g_{PREC}$ is plotted on the x-axis and is also identifiable via the straight line y=x as the lower end of the bar. The corresponding gain factors $g_{EIIP-PREC}$ are shown as the upper end of the bar. The length of the bar then indicates the achievable gain. Large gains are apparent particularly in situations in which the known methods produce very poor results.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A nonlinear precoding method based on modulo arithmetic for the transmit-side preequalization of K user signals to be transmitted in a digital broadcast channel with known transmission channel matrix H set up between a central transmitting station and K decentralized, non-interconnected receiving stations, the user signals consisting of data symbols $a_k$ with k from 1 to K from a signal constellation having $M_k \cdot$ levels and a signal point spacing $A_k$· with a periodic multiple representation of the undisturbedly-transmitted data symbols ak in data symbol intervals congruent for K receive-side modulo-decision devices, a transmit-power-minimizing selection of representatives $v_k$ from the range of values $a_k + A_k \cdot M_k \cdot z_{kk}$, where $z_{kk}$ is from the set of positive or negative integers including zero, and linear preequalization of the selected representatives $v_k$ to form transmit signals $x_k$ to be transmitted, comprising:

applying the nonlinear precoding method only to a reduced channel matrix $H_{red}$ that is calculated from the equation $H = H_{red} R$, whereby H is the known channel matrix and R is a residual interference matrix indicating remaining interferences at the receive-side, the residual interference matrix containing interference elements chosen to assume a range of values $A_k \cdot M_k z_{ki}$, where $z_{ik}$ is from the set of positive or negative integers including zero.

2. A nonlinear precoding method according to claim 1, wherein the matrixes F, B, and P for the nonlinear precoding of the reduced channel matrix $H_{red}$ in the transmit-side are obtained by factorization of the reduced channel matrix $H_{red}$ into a matrix F with orthogonal columns, a lower triangular matrix B and a permutation matrix P with the introduction of a receive-side scalar gain factor g according to: $P^T H_{red} = 1/g \, B \, F^{-1}$.

3. A nonlinear precoding method according to claim 2, wherein offset compensation is already carried out on the transmit signals Xk prior to transmission.

* * * * *